(12) United States Patent
Chen

(10) Patent No.: US 7,559,320 B2
(45) Date of Patent: Jul. 14, 2009

(54) GRILLING APPARATUS

(75) Inventor: Jan-Nan Chen, Taichung (TW)

(73) Assignee: Arlo Lin, Tortola (VG)

( * ) Notice: Subject to any disclaimer, the term of this patent is extended or adjusted under 35 U.S.C. 154(b) by 554 days.

(21) Appl. No.: 11/030,800

(22) Filed: Jan. 7, 2005

(65) Prior Publication Data
US 2006/0150964 A1    Jul. 13, 2006

(51) Int. Cl.
*A47J 37/00* (2006.01)
(52) U.S. Cl. ............... 126/25 R; 126/19 R; 126/39 BA
(58) Field of Classification Search ............ 126/25 R, 126/19 R, 39 C, 393 A, 275 R
See application file for complete search history.

(56) References Cited
U.S. PATENT DOCUMENTS 2,923,229 A * 2/1960 Halford .................... 99/339
4,752,863 A * 6/1988 Parrott .................... 362/128
4,850,333 A * 7/1989 Dellrud et al. ............ 126/25 A
4,984,797 A * 1/1991 Norsworthy ............ 273/145 C
5,165,384 A * 11/1992 Knutson ................. 126/25 C
5,918,536 A * 7/1999 Cheng ...................... 99/447
6,044,473 A * 3/2000 Kim ...................... 713/320
6,095,130 A * 8/2000 Faraj ..................... 126/25 R
6,308,616 B1 * 10/2001 Johnson .................... 99/339
6,843,649 B2 * 1/2005 Hart et al. ................ 431/126

OTHER PUBLICATIONS

Taiwan Patent Publication No. M245932, Oct. 11, 2004, 5 pages.

* cited by examiner

*Primary Examiner*—Derek S. Boles
(74) *Attorney, Agent, or Firm*—Alan Kamrath; Kamrath & Associates PA

(57) ABSTRACT

A grilling apparatus includes a stove, a cap for closing the stove and a lighting device for lighting. The cap is pivotally connected with the stove. The cap can be lifted from the stove. The lighting device is detachably installed on the stove. Thus, the lighting device can light a cooking area around the stove. The lighting device an be detached from the stove and used as a flashlight.

19 Claims, 9 Drawing Sheets

GRILLING APPARATUS

BACKGROUND OF INVENTION

1. Field of Invention

The present invention relates to a grilling apparatus and, more particularly, to a grilling apparatus with a lighting device.

2. Related Prior Art

According to Taiwanese Patent Publication M245932, a conventional grilling apparatus includes a case for containing fuel, a grill put on the case, a box installed on the case, a motor installed in the box, a skewer driven by the motor, a gooseneck extended from the box and a light connected with the goose neck. The motor is turned on and off through operating a switch installed on the box. The light is turned on and off through operating a switch 24 installed on the box. To drive the motor, the mains supply is required. However, this is difficult when the conventional grilling apparatus is used outdoors. Moreover, the box is inevitably bulky and heavy for including the motor and the skewer. Furthermore, the gooseneck causes a user trouble in packing.

The present invention is therefore intended to obviate or at least alleviate the problems encountered in the prior art.

SUMMARY OF INVENTION

According to the present invention, a grilling apparatus includes a stove, a cap for closing the stove and a lighting device for lighting. The cap is pivotally connected with the stove. The cap can be lifted from the stove. The lighting device is detachably installed on the stove. Thus, the lighting device can light a cooking area around the stove. The lighting device can be detached from the stove and used as a flashlight.

The primary advantage of the grilling apparatus of the present invention is convenience for outdoor users.

Other advantages and novel features of the invention will become more apparent from the following detailed description in conjunction with the attached drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
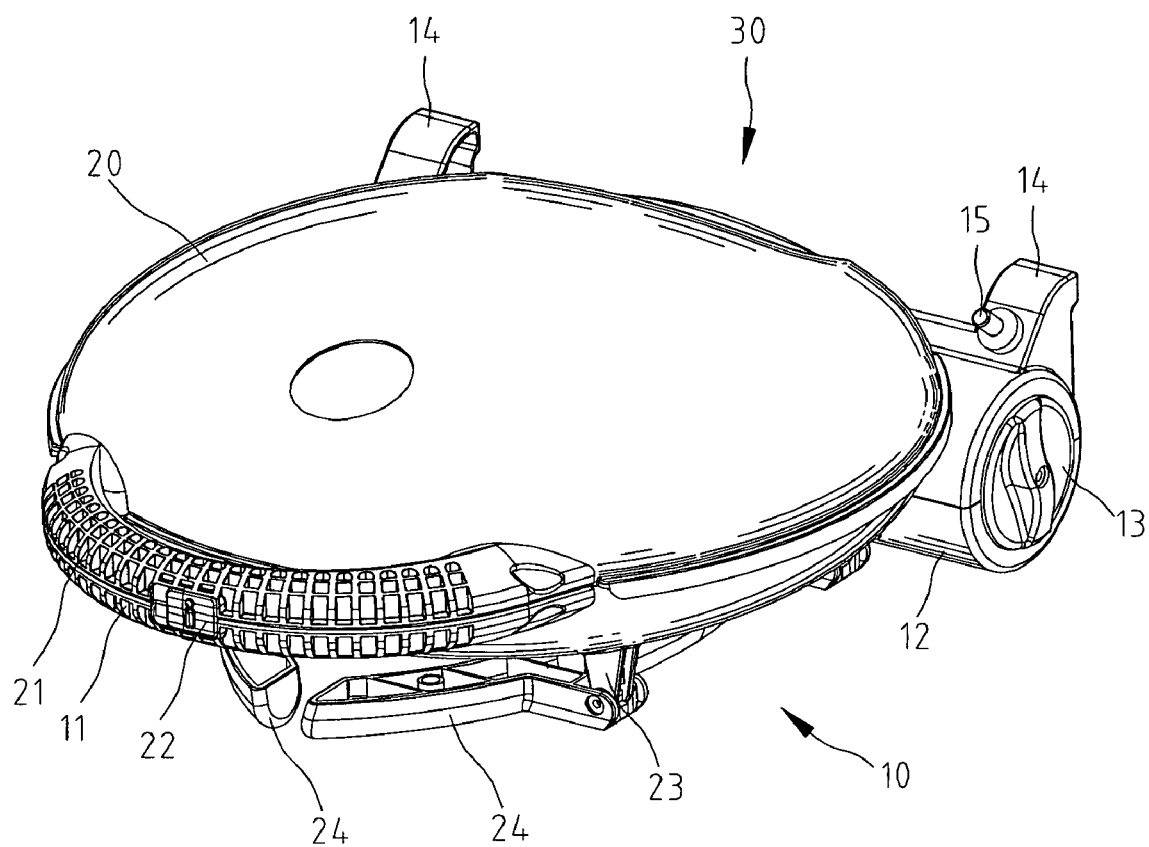
FIG. 1 is a perspective view of a grilling apparatus according to the preferred embodiment of the present invention.
Figure 2:
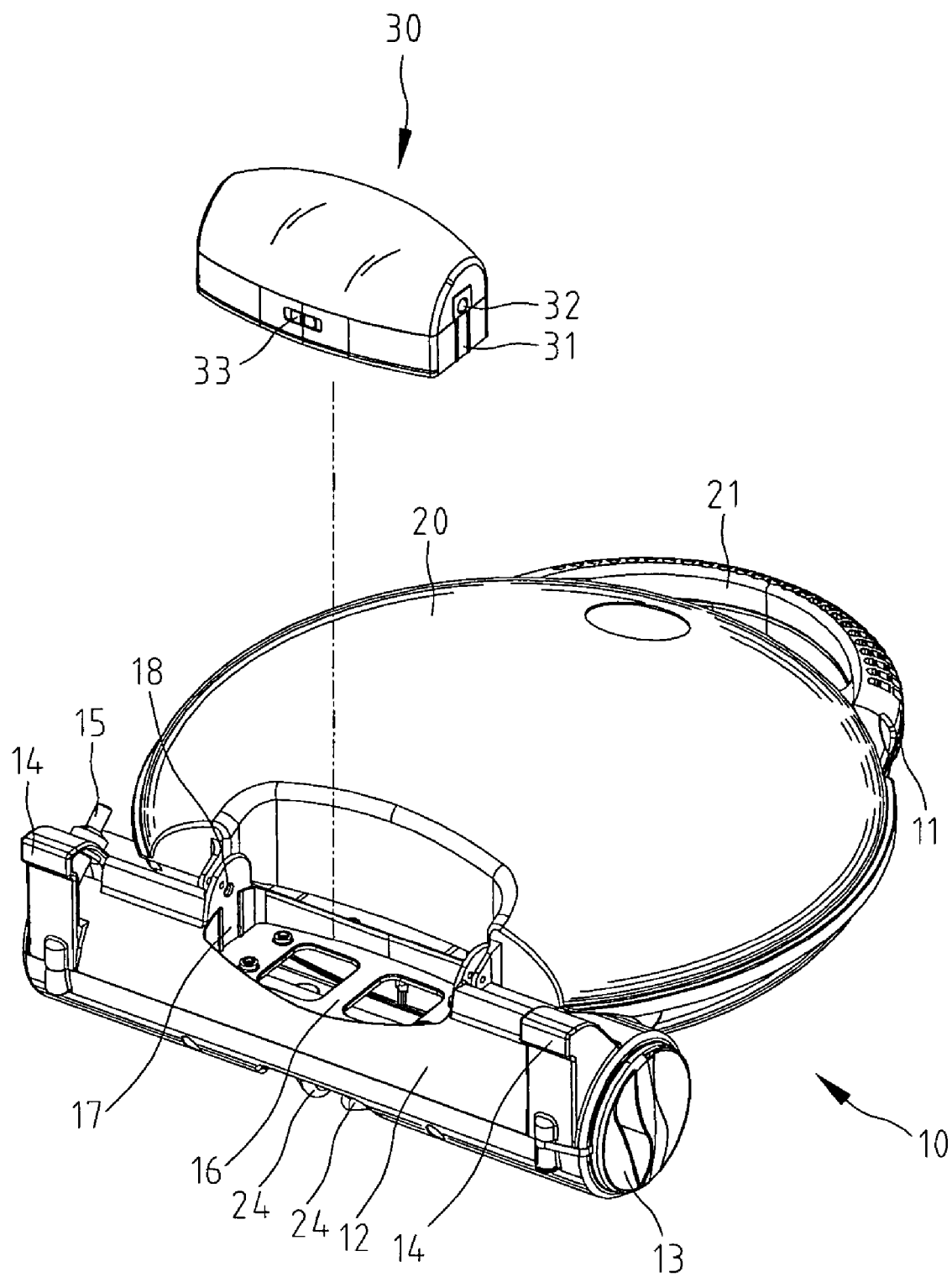
FIG. 2 is an exploded view of the grilling apparatus of FIG. 1.
Figure 3:
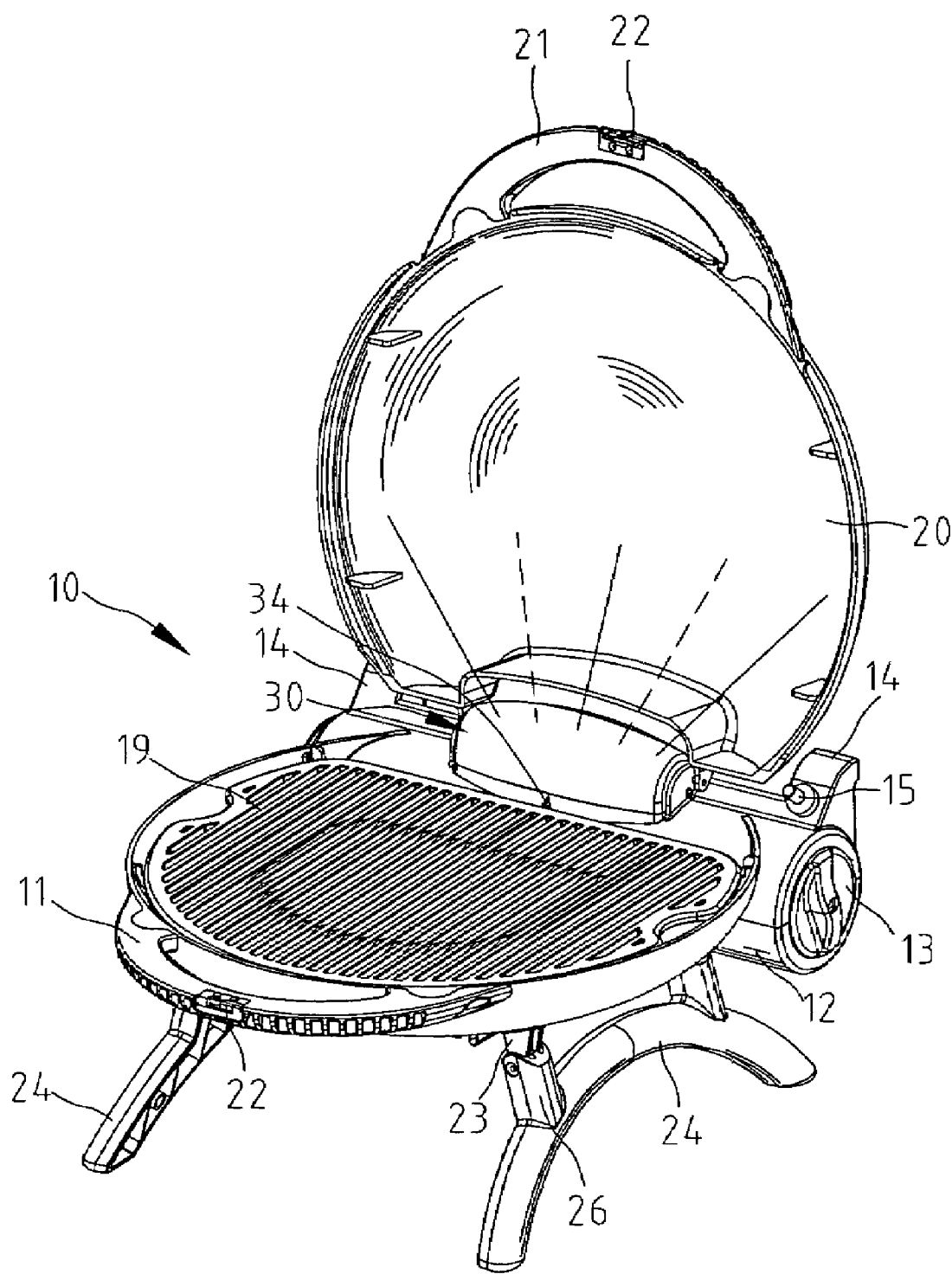
FIG. 3 is a perspective view of the grilling apparatus of FIG. 1 in use.

Referring to FIGS. 1 through 3, according to the preferred embodiment of the present invention, a grilling apparatus includes a stove 10, a cap 20 pivotally connected with the stove 10 and a lighting device 30 detachably installed on the stove 10.

Figure 6:
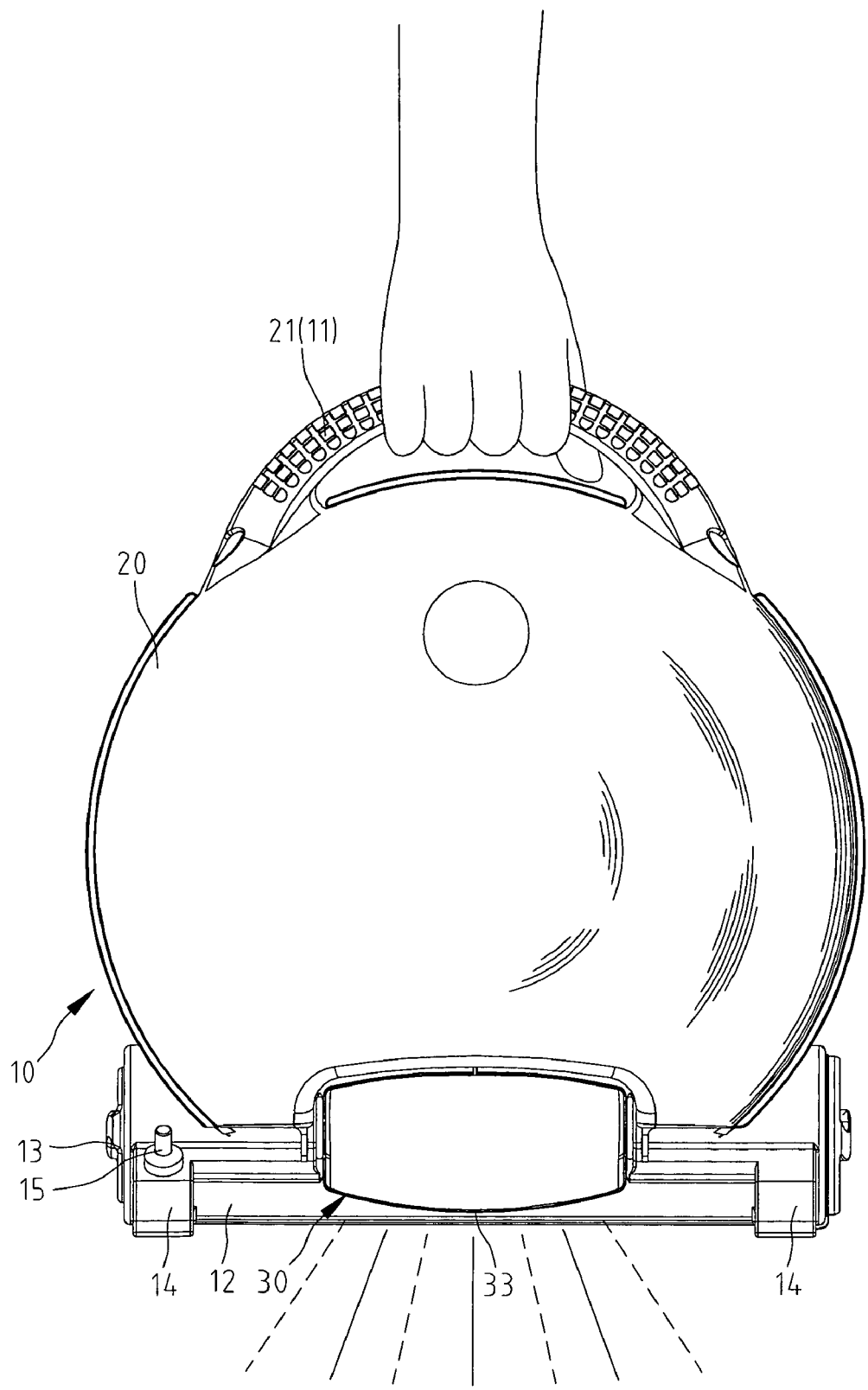
FIG. 6 is a side view of a hand carrying the grilling apparatus of FIG. 1

The stove 10 includes a handle 11 formed thereon in order to be held, a combustion chamber 12 formed thereon opposite to the handle 11 in order to hold a gas can or the like, two covers 13 for keeping the gas can in the combustion chamber 12, two auxiliary legs 14 formed on the combustion chamber 12 and a switch 15 installed on the combustion chamber 12 for controlling the combustion chamber 12. The auxiliary legs 14 of the grilling apparatus may be used to keep the grill apparatus standing as shown in FIG. 6.

Figure 8:
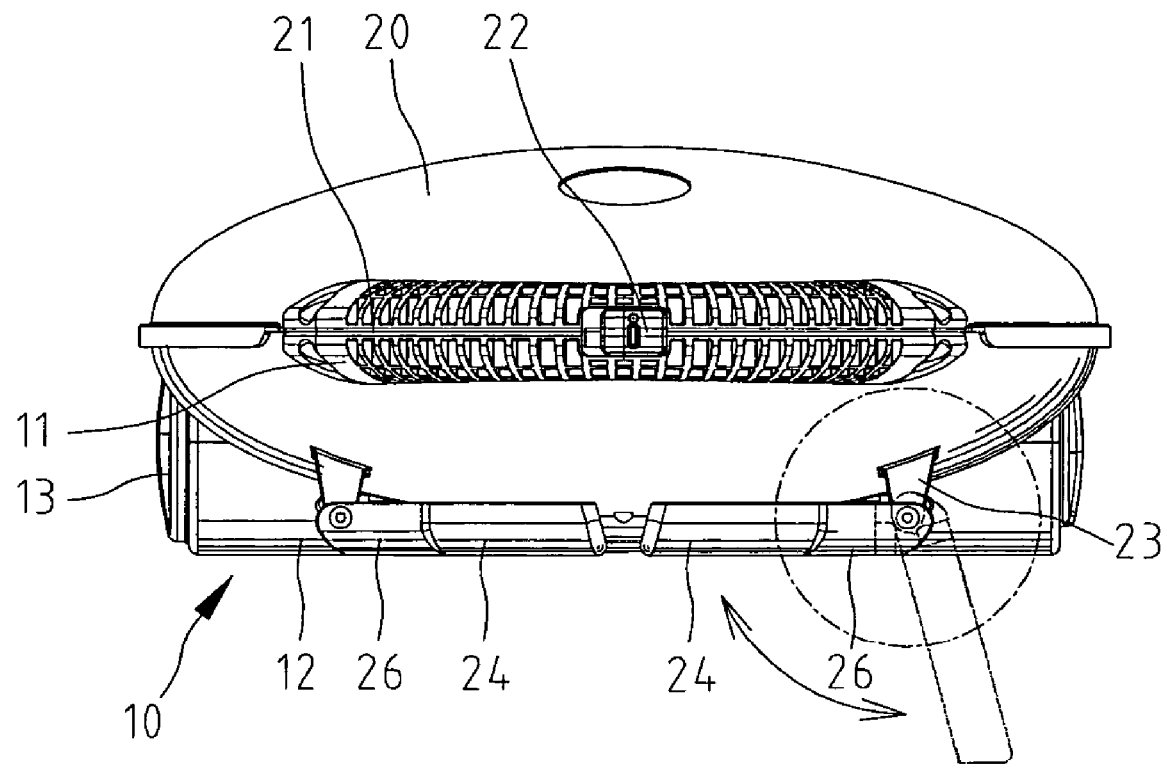
FIG. 8 is a front view of the grilling apparatus of FIG. 1 before use.
Figure 9:
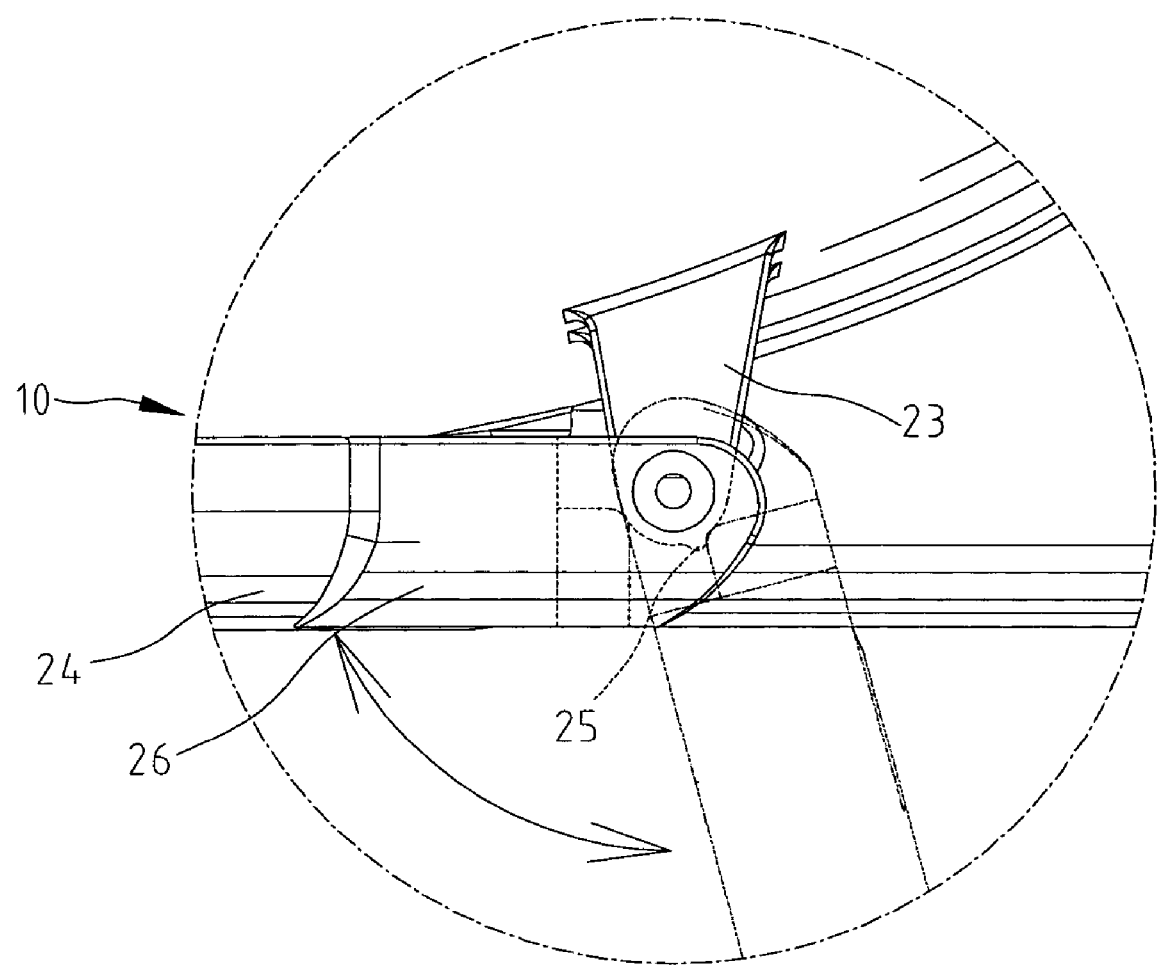
FIG. 9 is an enlarged partial side view of the grilling apparatus of FIG. 8.

Referring to FIGS. 8 and 9, four ears 23 are formed on a lower surface of the stove 10. A detent 25 is formed on each of the ears 23. There are two feet 24 used. Two legs 26 extend from each of the feet 24. Each ear 23 is pivotally connected with the related one of the legs 26. The legs 26 can be collapsed. In use of the grilling apparatus, the legs 26 are extended in order to support the grilling apparatus on a working surface such as the ground or a table. The detents 25 can abut against the upper ends of the legs 26 in order to keep the legs 26 in the extended status.

Referring to FIG. 3, the cap 20 includes a handle 21 formed thereon corresponding to the handle 11 of the stove 10. A locking device 22 is provided between the handle 12 of the cap 20 and the handle 11 of the stove 10. Thus, the cap 20 can be locked to the stove 10.

In use of the grilling apparatus, the cap 20 is pivoted from the stove 10 and a grill 19 is put on the stove 10. Food is laid on the grill 19 so that it can be grilled by the stove 10.

Referring to FIG. 2, a recess 16 is defined in the combustion chamber 12. The recess 16 includes two lateral walls. A groove 17 is defined in each of the lateral walls of the recess 16. A hole 18 is defined in each of the lateral walls of the recess 16.

The lighting device 30 is formed with two lateral sides on each of which a ridge 31 and a boss 32 are formed. The lighting device 30 can be put in the recess 16. The ridges 31 slide in the grooves 17 in order to ensure smooth movement of the lighting device 30 into the recess 16. The bosses 32 enter the holes 18 in order to keep the lighting device 30 in the recess 16.

Figure 4:
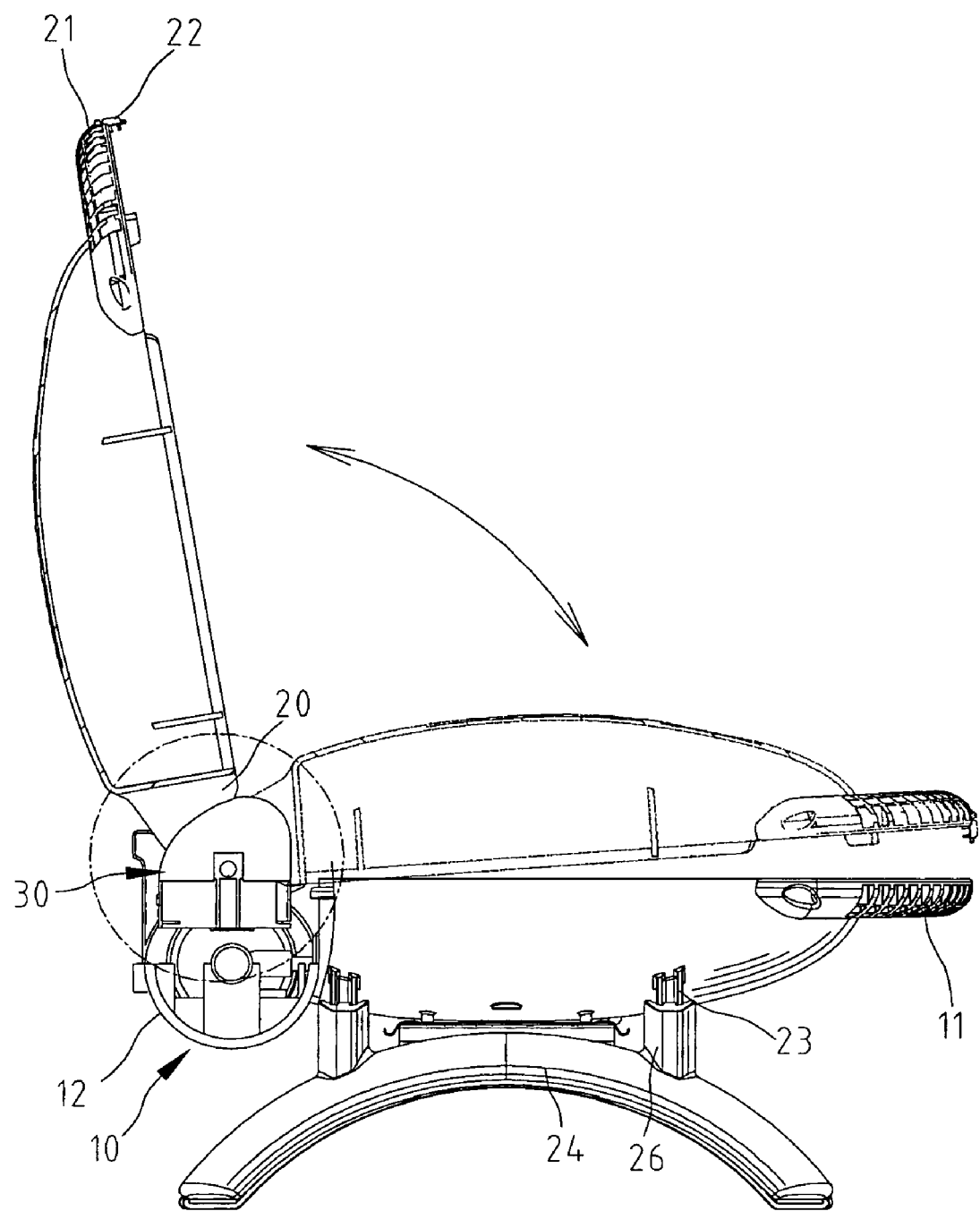
FIG. 4 is a side view of the grilling apparatus of FIG. 3.
Figure 5:
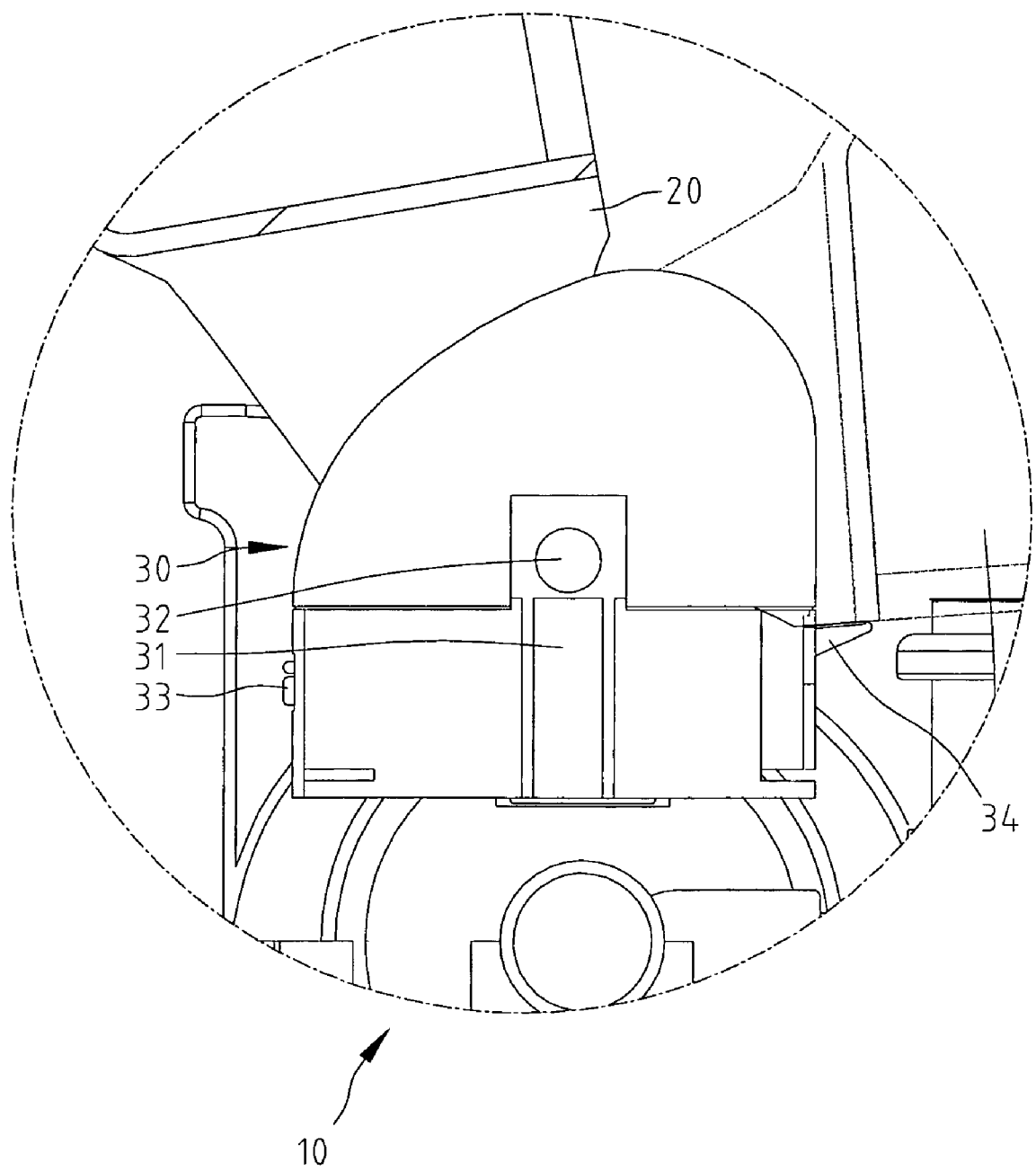
FIG. 5 is an enlarged partial side view of the grilling apparatus of FIG. 4.

Referring to FIGS. 4 and 5, a switch 33 is formed on a rear side of the lighting device 30. A micro-switch 34 is formed on a front side of the lighting device 30. The micro-switch 34 is normally on. As shown in phantom lines, when the stove 10 is closed by the cap 20, the micro-switch 34 is pressed by the cap 20 so that the lighting device 30 is off. As shown in bold lines, when the cap 20 is lifted from the stove 10, the micro-switch 34 is released from the cap 20 so that the lighting device 30 is on.

Referring to FIG. 6, when the grilling apparatus is not in use, the lighting device 30 can be turned on through operating the switch 33. In this case, the lighting device 30 is used like a flashlight.

Figure 7:
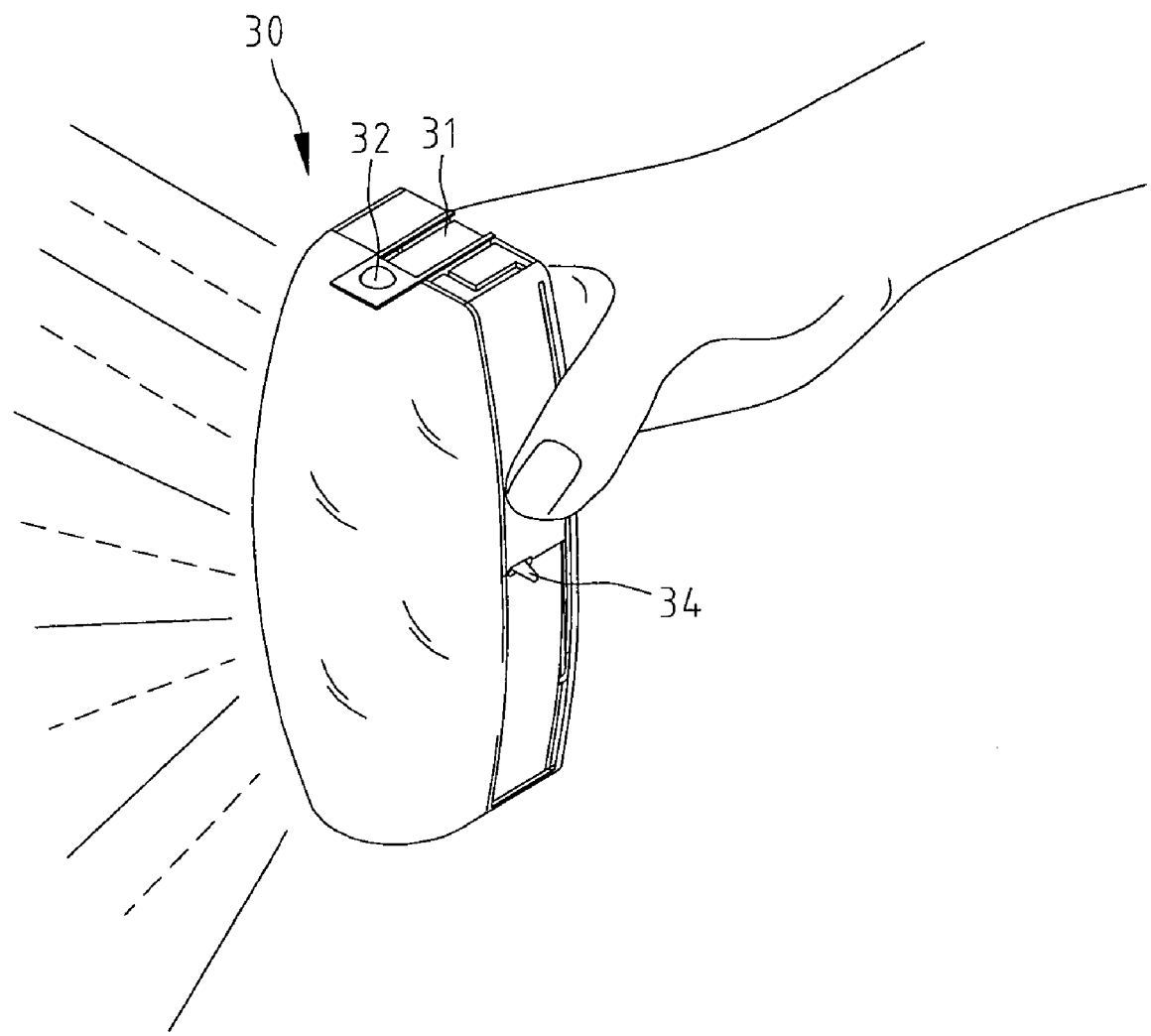
FIG. 7 is a perspective view of a hand holding a lighting device of the grilling apparatus of FIG. 3.

Referring to FIG. 7, the lighting device 30 is removed from the recess 16. The lighting device 30 is used independently of the stove 10.

The present invention has been described via detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A grilling apparatus comprising:

a stove, a cap pivotally connected with the stove, with the cap having an exterior portion and an interior portion, with the cap pivotable with respect to the stove between an open position and a closed position, with the cap at an oblique angle to the stove when the cap is in the open position, with the cap parallel to the stove when the cap is in the closed position, and a lighting device detachably installed on the stove, wherein the lighting device is separately formed and detached from the cap, with the lighting device remaining stationary on the stove when the lighting device is installed on the stove and when the cap is pivoted between the open and closed positions, wherein the lighting device illuminates the exterior portion of the cap and an area around the cap in the closed position, wherein the lighting device projects a light directed toward the interior portion of the cap, the stove and an area around the stove when the cap is in the open position, with the interior portion intermediate to the light and the exterior portion when the cap is in the open position.

2. The grilling apparatus according to claim 1 wherein the stove comprises a handle formed thereon in order to be held.

3. The grilling apparatus according to claim 1 wherein the stove comprises a combustion chamber formed thereon.

4. The grilling apparatus according to claim 3 wherein the combustion chamber comprises a switch installed thereon for controlling the combustion chamber.

5. The grilling apparatus according to claim 3 wherein the stove further comprises two covers for closing the combustion chamber.

6. The grilling apparatus according to claim 3 wherein the stove further comprises two auxiliary legs formed on an edge of the stove in order to keep the grill apparatus standing when the grilling apparatus is not in use.

7. The grilling apparatus according to claim 3 wherein the stove comprises a handle and wherein the cap comprises a handle formed thereon corresponding to the handle of the stove.

8. The grilling apparatus according to claim 7 comprising a locking device for locking the handle of the cap to the handle of the stove.

9. The grilling apparatus according to claim 1 further comprising two feet connected with a lower surface of the stove in order to support the grilling apparatus on a working surface.

10. The grilling apparatus according to claim 9 wherein each of the two feet are pivotally connected to the stove.

11. The grilling apparatus according to claim 10 further comprising two legs projecting from each of the two feet, wherein the stove further comprises four ears formed on the lower surface thereof and pivotally connected with the two legs.

12. The grilling apparatus according to claim 11 wherein each of the four ears comprises a detent formed thereon for abutment against each of the two legs in order to keep each the two legs extended.

13. The grilling apparatus according to claim I wherein the lighting device comprises a switch formed thereon.

14. The grilling apparatus according to claim 1 further comprising a grill installed on the stove.

15. The grilling apparatus according to claim 1 wherein the cap is pivotally connected to the stove by two hinges, with the lighting device located intermediate to the two hinges.

16. A grilling apparatus comprising:

a stove, a cap pivotally connected with the stove, and a lighting device detachably installed on the stove, wherein the stove comprises a recess defined therein in order to receive the lighting device, wherein the recess comprises two lateral walls and a groove defined in each of the two lateral walls, wherein the lighting device comprises two lateral sides and a ridge formed on each of the two lateral sides in order to slide in the groove in a related one of the two lateral walls in order to ensure smooth movement of the lighting device into the recess, wherein the cap is pivotable with respect to the stove between an open position and a closed position, wherein when the cap is in the open position, the lighting device is located in the cap for illuminating an area around the stove, and when the cap is in the closed position, the lighting device is located outside the cap, and the grilling apparatus can act as a movable illuminating device.

17. A grilling apparatus comprising:

a stove, a cap pivotally connected with the stove, and a lighting device detachably installed on the stove, wherein the stove comprises a recess defined therein in order to receive the lighting device, wherein the recess includes two lateral walls and a hole defined in each of the two lateral wails, where the lighting device comprises two lateral sides and a boss formed on each of the two lateral sides in order to enter the hole in a related one of the two lateral walls in order to keep the lighting device in the recess, wherein the cap is pivotable with respect to the stove between an open position and a closed position, wherein when the cap is in the open position, the lighting device is located in the cap for illuminating an area around the stove, and when the cap is in the closed position, the lighting device is located outside the cap, and the grilling apparatus can act as a movable illuminating device.

18. The grilling apparatus according to claim 16 wherein the cap is pivotally connected to the stove by two hinges, with the lighting device located intermediate to the two hinges.

19. The grilling apparatus according to claim 17 wherein the cap is pivotally connected to the stove by two hinges, with the lighting device located intermediate to the two hinges.

* * * * *